3,155,870
AUTOMATIC RADAR DISPLAY CENTERING SYSTEM

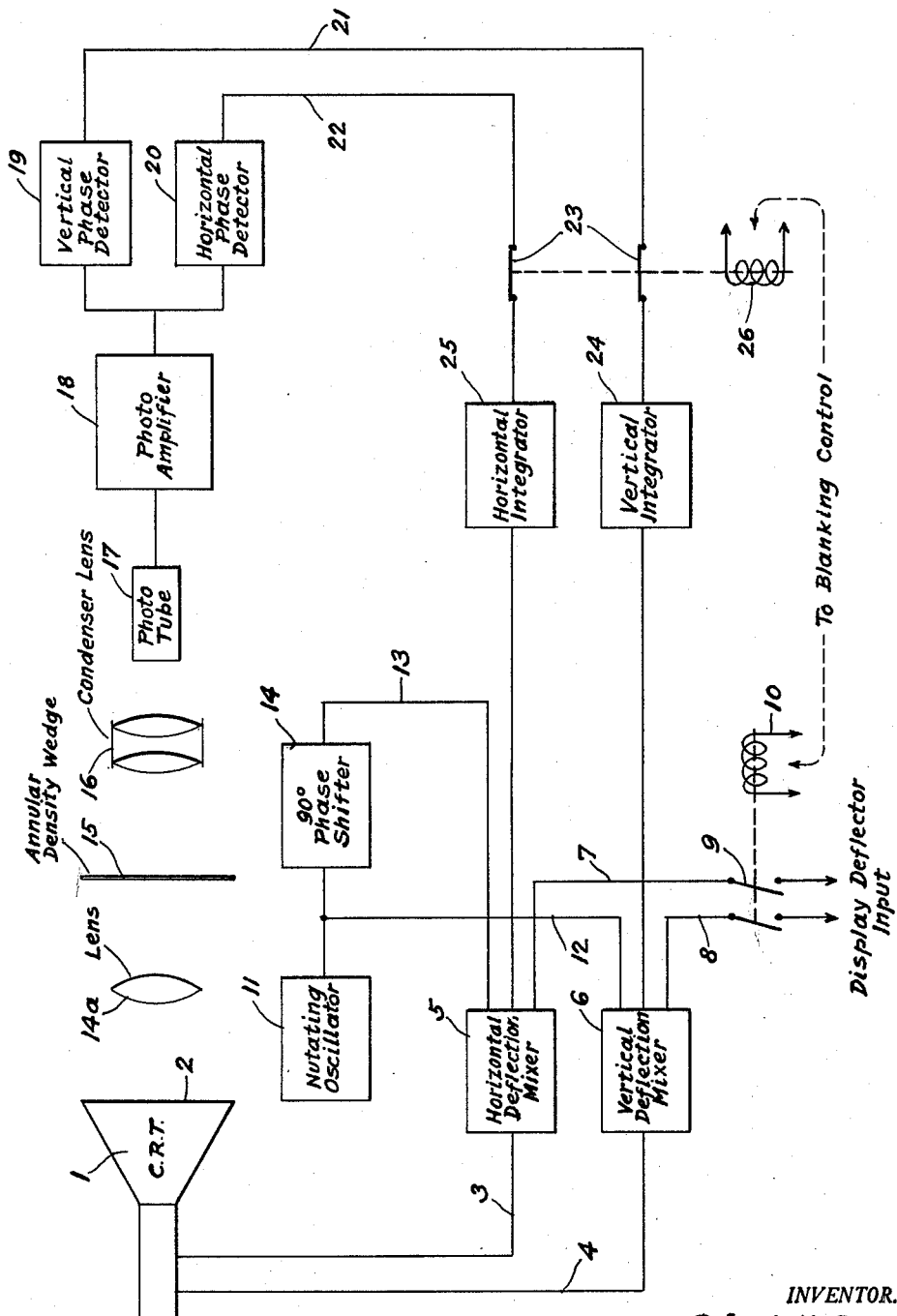

Robert M. Byrne, Hartsdale, N.Y., assignor to Goodyear Aerospace Corporation, a corporation of Delaware
Filed Aug. 19, 1955, Ser. No. 529,392
7 Claims. (Cl. 315—18)

This invention relates to the automatic centering of a display on a cathode ray tube, especially where a plan position indicator display of a radar system is to be centered for matching with previously obtained radar photographs or in other cases where it is necessary or desirable to overcome shifting of the display due to drifting of amplifiers, variation in power supplies or other factors affecting operation of the system.

Heretofore, in the operation of plan position indicator display apparatus, shifting of position of the display on the cathode ray tube has been experienced due to drifting of amplifiers, variations in voltage of power supplies, changes in components due to temperature changes, and other variations. Such shifting of the display has been especially troublesome where matching of the display with previously obtained fixed information, such as a previously obtained radar photograph was necessary.

It is an object of the present invention to provide convenient efficient and precise positioning of a plan position indicator display on the face of a cathode ray tube substantially free from errors due to drift in the system.

Another object is to overcome errors in the positioning of photographic films or plates relative to the display on the cathode ray tube.

These and other objects will appear from the following description and drawings.

Of the drawings:

The sole illustration is a diagram of an apparatus constructed in accordance with and embodying the invention.

The invention includes a cathode ray tube on the face of which a display is provided. By applying nutating voltages to the display tube, the display is rotated in a circular path of small radius relative to the center of the display tube. An image of the nutated display is focused on an annular density wedge whose density varies radially, and the light transmitted by the wedge is focused on a photo tube. The output of the photo tube is fed to two phase detectors, the reference voltages to which are the same as supplied to the cathode ray tube to nutate the display. These reference voltages are sine wave voltages and are supplied to the two phase detectors with the reference voltage to one phase detector advanced in phase 90° relative to the voltage supplied to the other phase detector. The outputs of the phase detectors are error signals which are integrated and fed back to the deflection circuits of the cathode ray tube to center the nutation circle relative to the density wedge.

Means are provided for intermittently disconnecting the display deflection input to the cathode ray tube by suitable blanking apparatus, and it is arranged for the centering system to operate during the blanking periods of the plan position indicator display and to discontinue the normal sweep voltages. The nutation voltages are applied thereto and the inputs of the integrators are closed. During the display period, the inputs to the integrators are opened, thus holding their outputs constant. The position of the display is therefore held constant during the display period and centering corrected during the blanking period.

Referring to the drawings, the numeral 1 designates a cathode ray tube on the face 2 of which a display is provided by signals supplied through lines 3, 4 by horizontal and vertical deflection mixers 5, 6 respectively. The display signal input to the horizontal and vertical deflection mixers is intermittently supplied through lines 7, 8 from a display deflection input double pole single throw switch 9 operated by a solenoid 10 powered by a suitable blanking control mechanism (not shown). The display signal is mixed with the output of a nutation oscillator 11 supplied directly to the vertical deflection mixer 6 through a line 12 and to the horizontal deflection mixer through a line 13 after passing through a phase shifter 14 to change the phase 90 degrees.

For providing an error correction signal, a lens 14a is mounted to pick up a display spot on the cathode ray tube face and focus its image upon an annular density wedge 15. The wedge 15 may comprise a flat plate containing a film varying radially in density. Such a plate is preferably one having a point of least density to transmission of light at its center and increasing radially in density in every direction along the plate at the same rate of density increase. However, a plate having a central point of greatest density and decreasing radially in density in every direction along the plate at the same rate of density decrease may be employed for the purpose. Such plates may be made by providing a developed photographic film or plate resulting from varying exposure radially about a central point in all directions. A condensing lens 16 focuses the light emitted by the annular density wedge upon a photo tube 17 the output of which is amplified by an amplifier 18.

The output of amplifier 18 is passed to a vertical phase detector 19 and a horizontal phase detector 20. The outputs of these phase detectors are delivered through lines 21, 22 by way of a double pole single throw switch 23 to vertical and horizontal integrators 24 and 25 respectively. The outputs of these integrators provide deflection correction outputs which are respectively fed to the horizontal mixer 5 by the horizontal integrator 25 and to vertical mixer 6 by the vertical integrator 24. The switch 23 is operated by a solenoid 26 controlled by the same blanking control circuit as the solenoid 10, the arrangement being such that when switch 9 is open, switch 23 is closed and when switch 9 is closed, switch 23 is open.

With the foregoing arrangement, the centering system operates during the blanking periods of the plan position indicator display at which time the normal sweep is discontinued, the nutation voltages are applied and the inputs to the integrators are closed. During the display period, the inputs to the integrators are opened, thus holding their outputs constant. The position of the display is, therefore, held constant during the display period and centering is corrected during the blanking period.

While either a cathode ray tube having electrostatic deflection or one having magnetic deflection may be employed with this circuit, it is preferred to employ an electrostatic deflection tube as the magnetic deflection requires considerable power to drive the deflecting coils.

The photo tube amplifier, the phase detectors, integrators, nutation oscillator, phase shifter, and deflection mixers are of ordinary known construction.

When the system of this invention is used in the case of matching radar photographs with the plan position indicator display, it is convenient to generate the density wedge at the center of the cathode ray tube during the photographic run so that the center of the density wedge is the center of the photographed display. The center of the cathode ray tube display during matching is then corrected for the center of the photograph.

The use of this centering system provides a precise means of centering cathode ray tube displays without requiring precision voltage supplies or driftless amplifiers. In addition, the mechanical tolerances for matching radar photographs may be increased without increasing error. Errors of one tenth inch or larger in centering may be corrected for. The centering error in the system has been found to be less than plus or minus, one one-thousandth of an inch.

While a certain representative embodiment and details have been shown for the purpose of illustrating the invention, it will be apparent to those skilled in this art that various changes and modifications may be made therein without departing from the spirit or scope of the invention.

I claim:

1. A centering system for the display produced on a cathode ray tube by the output of horizontal and vertical deflection mixers supplied by an intermittent blanked deflection input signal and the output of a single nutation oscillator applied to the mixers in quadrature phases, said system comprising an annular density wedge of radially varying density, means for focusing a spot display of said cathode ray tube on said density wedge during a blanking of the deflection input signal, photo-electric means for receiving light of said spot transmitted through said wedge to produce an electric signal, means for separating and integrating vertical and horizontal phase components of said signal as centering error correction voltages, and means for applying said corrective voltages to said cathode ray tube to correct centering of said display.

2. A centering system for the display produced on a cathode ray tube by the output of horizontal and vertical deflection mixers supplied by an intermittent blanked deflection input signal and the output of a single nutation oscillator applied to the mixers in quadrature phases, said system comprising an annular density wedge of radially varying density, means for focusing a spot display of said cathode ray tube on said density wedge during a blanking of the deflection input signal, photo-electric means for receiving light of said spot transmitted through said wedge to produce an electric signal, means for separating and integrating vertical and horizontal phase components of said signal as centering error correction voltages, means for applying said corrective voltages to said cathode ray tube to correct centering of said display, and means for removing said corrective voltages from said cathode ray tube between blanking periods.

3. A centering system as defined by claim 1 in which said photo-electric means comprises a condensing lens for collecting and focusing light transmitted by said wedge, and a photo tube for receiving the focused light and generating an electric signal.

4. A centering system as defined by claim 1 in which the means for separating and integrating vertical and horizontal phase components of the photo electric means comprises a vertical phase detector and a horizontal phase detector supplied by the output of said photo-electric means, vertical and horizontal integrators for receiving the output of the respective detectors and delivering their outputs to respective vertical and horizontal deflection mixers, and switch means for interrupting the inputs to said integrators between blanking periods.

5. A centering system for the display produced on a cathode ray tube by the output of horizontal and vertical deflection mixers supplied by an intermittently blanked deflection input signal and the output of a single nutation oscillator applied to the mixers in quadrature phases, said system comprising an annular density wedge of radially varying density, means for focusing a spot display of said cathode ray tube on said density wedge during a blanking of the deflection input signals, a photo tube, means for focusing light transmitted by said wedge upon said photo tube, means for separating and integrating vertical and horizontal phase components of the output of said photo tube as centering error correction voltages, and means for applying said corrective voltages to said cathode ray tube to correct the centering.

6. A centering system as defined by claim 5 in which said annular density wedge comprises a plate increasing in density to the transmission of light from a point thereon radially outward in every direction in the plane of said plate.

7. A centering system as defined by claim 5 in which said annular density wedge comprises a plate having a point of greatest density to transmission of light and decreasing in density radially outward of said point in every direction in the plane of said plate.

No references cited.